United States Patent [19]

Schulz et al.

[11] Patent Number: 4,715,674
[45] Date of Patent: Dec. 29, 1987

[54] LIGHT-WAVE GUIDE-PLUG CONNECTION

[75] Inventors: Dietmar Schulz, Munich; Peter Pohl, Stockdorf, both of Fed. Rep. of Germany; Alfred H. Johnson, Poughkeepsie, N.Y.

[73] Assignees: Siemens Aktiengesellschaft, Berlin and Munich, Fed. Rep. of Germany; IBM, Armonk, N.Y.

[21] Appl. No.: 5,053

[22] Filed: Jan. 20, 1987

[51] Int. Cl.$^4$ .................................................. G02B 6/38
[52] U.S. Cl. ............................... 350/96.21; 350/96.22
[58] Field of Search ................ 350/96.20, 96.21, 96.22

[56] References Cited

U.S. PATENT DOCUMENTS

| | | | |
|---|---|---|---|
| 4,291,943 | 9/1981 | Binek et al. | 350/96.22 |
| 4,330,172 | 5/1982 | Monaghan et al. | 350/96.21 |

FOREIGN PATENT DOCUMENTS

| | | | |
|---|---|---|---|
| 2939231 | 2/1981 | Fed. Rep. of Germany. | |
| 8600147 | 1/1986 | PCT Int'l Appl. | 350/96.21 |

*Primary Examiner*—John Lee
*Assistant Examiner*—Michael Menz
*Attorney, Agent, or Firm*—Jeffrey P. Morris

[57] ABSTRACT

Adjacent lying plug-connector halves, the front ends of which exhibit pin or sleeve shaped plug elements, are provided with first and second supporting bodies, of which the first supporting body, with a sleeve shaped plug element, may be connected by means of a joinable groove-tenon-interconnect lying crosswise to the plug insertion direction, and exhibits an entrance channel for a plug connector half with a pin shaped plug element. The second supporting body with a concentric guiding tube for the insertion of pin shaped plug elements from both directions exhibits a tenon-groove-interlock contour at both ends that matches that of a sleeve shaped plug element. The first supporting body can therefore be interlocked with second supporting bodies or sleeve shaped plug elements at choice, whereby light wave guides single or double plugs may be connected to transmit- and/or receive modules and light wave guides single or double plugs may be inter-connected.

3 Claims, 5 Drawing Figures

LIGHT-WAVE GUIDE-PLUG CONNECTION

BACKGROUND OF THE INVENTION

1. Field of the Invention

The ivention relates to a light wave guide-plug connection with plug-connector halves which exhibit at least one, either pin or sleeve, shaped connector element.

2. Description of the Prior Art

Such a light wave guide-plug connection is known from DE-OS No. 29 39 231. In this known plug connection the plug connector halves with sleeve shaped connector elements are constructed with transmit and/or receive modules that act as electro-optical and opto-electrical transducers. The insertion of the pin-shaped plug element, that is designed as a double plug, into the sleeve formed plug element effects the coupling of an electro-optical and/or an opto-electrical transducer to a light conducting fiber whose end section is concentrically positioned in a pin type connector part.

In the path of a light wave guide transmission section, it is frequently necessary to bring the front surface of a light conducting fiber in contact with another light conducting fiber, to lengthen the transmission section, for example.

SUMMARY OF THE INVENTION

The object of the present invention is thus, to configure a light wave guide-plug connection so that at least one pin-shaped plug element may be mated, either with a sleeve-shaped plug element or to another pin-shaped plug element, through a fail safe connection.

This problem is solved according to the invention, in that the plug connector half with a sleeve-shaped plug element may be connected with the first of two supporting bodies through a joining tenon-groove-interlock lying crosswise to the plug axis, such that the first supporting body exhibits an entrance channel for a plug connector half with at least one pin-shaped plug element, and such that a second supporting body is provided with a concentric guiding tube for inserting pin-shaped plug elements from both sides, and exhibits an interlock contour that accommodates the tenon-groove-interlock contour of the plug connector half in the sleeve-shaped plug element.

Through this configuration of a light wave guide-plug connection it is possible, particularly with the help of the second supporting body, to connect a first supporting body with one of the two ends of a second supporting body through a joining tenon-groove-interlock, lying crosswise to the plug axis and, since the first supporting bodies exhibit an entrance channel for engaging a plug connector half with at least one pin-shaped plug element, to then insert a plug connector half with pin shaped elements into such a first supporting body. If instead a sleeve-shaped connector element is connected with a first supporting body by means of a joining tenon-groove-interlock lying crosswise to the plug axis, a connection may be obtained between a transmit- or receive module that is fitted with a sleeve-shaped plug element and a plug connector half with pin-shaped plug elements. Through the identical interlock structure on a sleeve-shaped plug element and both ends of the second supporting body, these parts are mutually interchangeble relative to the first supporting body.

In a further embodiment of the invention, provision is made for a plug connector half with pin-shaped plug elements designed as a double plug, the first supporting body has an entrance channel fitting the double plug, and is provided with two tenon-groove-interlock contours lying side by side.

This makes it advantageous to connect a transmit- and a receive module, with their respective corresponding sleeve-shaped plug elements, through associated tenon-groove-interlock contour with the first supporting body.

Finally, additional provision may be made, in accordance with the present invention, for a press-fit between the joined tenons and grooves of the interlock contours, and for the free ends of at least one of the tenons to exhibit a wedge-shaped taper.

By means of the press-fit, the parts joined through the tenon-groove-interlock are automatically held together and the wedge-shaped tapering of the free ends makes it possible to slide the tenons into the grooves of the tenon-groove-interlock in a relatively uncomplicated way, despite the press fit.

BRIEF DESCRIPTION OF THE DRAWINGS

Embodiments of the invention are illustrated by way of example in the following figures.

DESCRIPTION OF THE PREFERRED EMBODIMENTS

Figure 1:
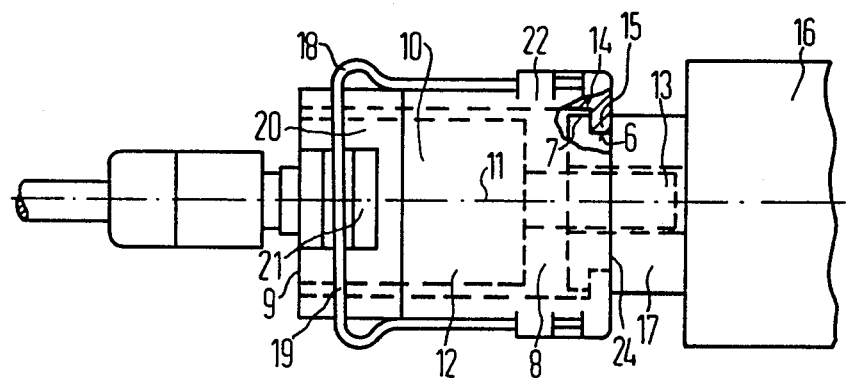
FIG. 1 is a top view of a light wave guide-plug connection in accordance with the invention in which a first supporting body is connected with a shell shaped plug element through a tenon-groove-interlock and a plug connector half with a pin-shaped plug element pushed into the first supporting body and with its pin-shaped plug element inserted into the sleeve-shaped plug element.

It will be understood from the details of the Figures that a second supporting body 1, that may be made of metal or plastic, for example, has a cuboid shape and exhibits an interspersed guiding tube 3, between two front surfaces 2, that is concentric with a longitudinal axis 4 of the body 1. This tube 3, may be a hard metal insert in body 1, for example. Two grooves 6, lying parallel to each other and crosswise to the tube 3, are provided in two opposing side surfaces 5 of the body 1, that lie parallel to the longitudinal axis 4. A groove 6 is provided on each side 5, near a front face 2, so that a tenon 7 is formed between a groove 6 and a front face 2.

First supporting bodies 8, 8a, also preferably of metal or plastic are provided, that lie adjacent to the second supporting bodies 1. At a front face 9 that lies crosswise to the longitudinal axis 11 of a body 8, 8a, there is accessible an entrance channel 10, that is surrounded by the body 8, 8a. A light wave guide plug connector half 12, with at least one pin-shaped plug element 13, may be inserted into this entrance channel 10, from the side 9 of the body 8, 8a.

Figure 2:
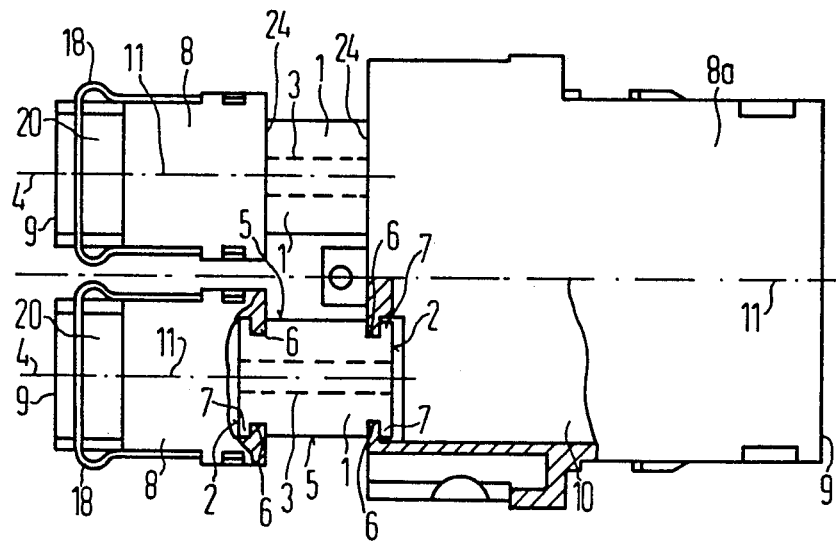
FIG. 2 is a top view of two second supporting bodies in accordance with the invention connected on one side through tenon-groove interlocks with a first supporting body dimensioned for engagement with a light wave guide double plug, and connected on the other side respectively with a dimensioned first supporting body for engaging a plug connector half with a single pin-shaped plug element.

Instead of a first body 8 to which a light wave guide-plug connector half with a single pin-shaped plug element 13 may be attached, it is also possible (as shown in FIG. 2) to provide a first body 8a, that can receive a light wave guide double plug connector half with two pin-shaped plug elements.

Figure 4:
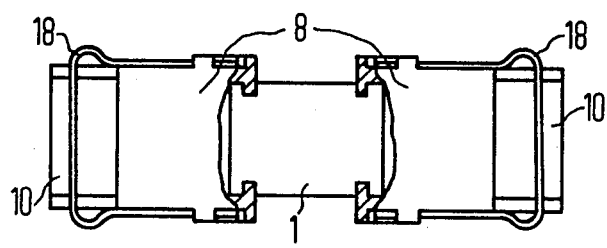
FIGS. 4 and 5 are illustrative of further connection arrangements between the first and second supporting bodies.
Figure 5:
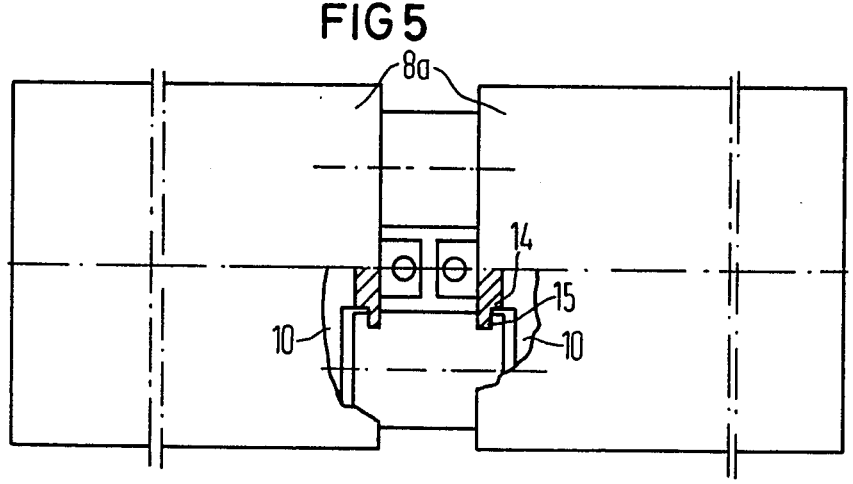

Each body 8 and/or 8a is provided with one (in the case of plug connector half with one pin-shaped plug element), or two adjacent lying (in the case of a body 8a configured for a plug connector half with two pin-shaped plug elements) tenon-groove-interlock contours 14, 15 on the side 24 opposite side 9, that are designed to be complementary to the tenon-groove-interlock 6, 7 of the body 1. Since a plug connector half 16 with a sleeve-shaped-plug element 17 also has a tenon-groove-interlock contour 6, 7 that corresponds to the interlock contour of a body 1, the bodies 8, 8a may be connected, at choice, with a body 1 or with a plug connector half 16 with sleeve-shaped plug element 17. It is therefore possible, for example, to interconnect a plug connector half exhibiting two adjacent lying pin-shaped plug elements with two plug connector halves but one pin-shaped plug element. Such a combination of body 1 and bodies 8, 8a is shown in FIG. 2 for example. Two bodies 8a, may be connected by means of two bodies 1 to each other, as shown in FIG. 5 for example, so that two plug connector halves with each having two pin-shaped plug elements may be connected together. A body 1, as well as a plug connector half 16, with sleeve-shaped plug element 17, may also be connected by means of a body 8a since the interlock contour of the plug connector half 16 corresponds to that of body 1. Should a body 8 be connected to both sides of a body 1, as shown in FIG. 4 for example, two plug connector halves, each having one pin-shaped plug element may be connected together.

Figure 3:
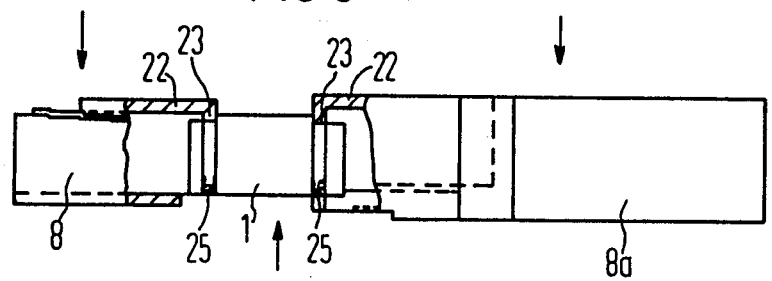
FIG. 3 is a side view of the invention shown in FIG. 2, in which the interlock region is visible through a wall of the first supporting bodies.

In the engaged position, which is achieved through motion of the parts to be interlocked, in the direction of the arrows as shown in FIG. 3, the tenon-groove-interlock holds the interlocked parts together in the direction of the axes 4, 11 and is protected against separation of the interlocked parts through a pressure fit, particularly between the tenon 15 of a body 8 and/or 8a and a groove 6 of a body 1 or a plug element 17. The isertion of a tenon 15 into a groove 6 is eased through the wedge-shaped tapering 25 of the tenon 15, as shown in FIG. 3, for example.

In order to hold a plug connector half 12 fast to a pin-shaped plug element 13, a body 8 carries a hoop 18 which, with a cross piece 19, bridges a window 20 in the body 8 and snaps behind a projection 21 provided on the plug connector half 12.

The tenon-groove-interlock contour running crosswise to the axis 4 and/or 11 is covered on the bodies 8, 8a by a wall 22 as shown by FIG. 3 which stretches parallel to the axes 4 and/or 11, so that upon engagement, the interlock contours of a plug connector half 16 or a body 1 and an interlock contour of a body 8 or 8a, a stop 23 results which limits the insertion of the interlock contours to the optimal position in bodies 8, 8a relative to body 1, or a plug connector half 16.

What is claimed is:

1. A light wave guide-plug connection with plug connector halves in which the forward ends have at least a pin, or sleeve shaped plug element, comprising:

a plug connector half with a sleeve shaped plug element formed for connection with a pin shaped plug element joinable with a first of two supporting bodies the first body including an entrance channel for inserting said plug-connector half with at least one pin shaped plug element such that a joined position of the plug connector half with the sleeve shaped plug element and the first supporting body is obtained through tenon-groove-interlock contours of the plug connector half with the sleeve shaped plug element and the first supporting body lying crosswise to a plug axis, and a motion of the plug connector half with the sleeve shaped plug element and the first supporting body crosswise to the plug axis;

a second supporting body having a guiding tube for the insertion of pin shaped plug elements from both sides, and having at said both sides interlock contours of like configuration as the interlock contours of the plug connector half with said sleeve shaped plug element.

2. A light wave guide-plug connection accordng to claim 1, wherein the plug-connector half having pin-shaped plug elements is configured as a double plug, such that the first supporting body has an entrance channel matching the double plug, and is provided with two adjacent lying tenon-groove-interlock contours 3. A light wave guide-plug connection according to claim 1 or 2, wherein a press-fit is provided between the joined tenons and grooves of the interlock contours and wherein the free ends of the tenons are provided with a wedge-shaped taper.

* * * * *